(12) United States Patent
Tominaga et al.

(10) Patent No.: US 7,696,279 B2
(45) Date of Patent: Apr. 13, 2010

(54) PROCESS FOR PRODUCING THERMOPLASTIC ELASTOMER COMPOSITION

(75) Inventors: Takeshi Tominaga, Sodegaura (JP); Masamichi Ishibashi, Hiroshima (JP); Kanji Idehara, Hiroshima (JP); Kenji Tomomitsu, Hiroshima (JP)

(73) Assignees: Sumitomo Chemical Company, Limited, Chuo-ku, Tokyo (JP); The Japan Steel Works, Ltd., Chiyoda-ku, Tokyo (JP)

( * ) Notice: Subject to any disclaimer, the term of this patent is extended or adjusted under 35 U.S.C. 154(b) by 1015 days.

(21) Appl. No.: 11/255,931

(22) Filed: Oct. 24, 2005

(65) Prior Publication Data

US 2006/0089459 A1    Apr. 27, 2006

(30) Foreign Application Priority Data

Oct. 26, 2004    (JP)    ............... P2004-310668

(51) Int. Cl.
 *C08L 23/00*    (2006.01)
 *C08L 23/04*    (2006.01)
(52) U.S. Cl. .................. 525/191; 525/232; 525/240
(58) Field of Classification Search ............ 525/191, 525/232, 240
See application file for complete search history.

(56) References Cited

U.S. PATENT DOCUMENTS 4,594,390 A * 6/1986 Abdou-Sabet et al. ...... 525/232
5,847,052 A   12/1998 Hamanaka et al.
6,599,981 B2  7/2003 Itoh et al.

FOREIGN PATENT DOCUMENTS

JP   2001-187405 A   7/2001

* cited by examiner

*Primary Examiner*—Nathan M Nutter
(74) *Attorney, Agent, or Firm*—Sughrue Mion, PLLC

(57) ABSTRACT

A process for producing a thermoplastic elastomer composition, which comprises the steps of:

(1) supplying at least an olefin copolymer rubber and an olefin resin to a plasticization-kneading zone of a biaxial extruder, which zone has at least two kneading discs forming a tip clearance of 1% or larger and smaller than 10% of an inner diameter of a cylinder in the biaxial extruder, thereby forming a melt-kneaded product; and (2) supplying an organic peroxide to a dynamically cross-linking zone of the biaxial extruder, which zone (i) is located after the plasticization-kneading zone, and (ii) has at least two kneading discs forming a tip clearance of 1% or smaller of the inner diameter of the cylinder in the biaxial extruder, thereby dynamically cross-linking the melt-kneaded product with the organic peroxide.

7 Claims, 3 Drawing Sheets

PROCESS FOR PRODUCING THERMOPLASTIC ELASTOMER COMPOSITION

FIELD OF THE INVENTION

The present invention relates to a process for producing a thermoplastic elastomer composition using at least an olefin copolymer rubber, an olefin resin and an organic peroxide with a biaxial extruder having a kneading disc, which forms a specific size of a tip clearance.

BACKGROUND OF THE INVENTION

Regarding a process for producing a thermoplastic elastomer composition comprising the step of dynamically cross-linking a rubber and a resin with a specific biaxial extruder:

(1) U.S. Pat. No. 5,847,052A discloses a process for producing a thermoplastic elastomer composition using an olefin copolymer rubber and an olefin plastic; and (2) U.S. Pat. No. 6,599,981B2 discloses a process for producing an olefin thermoplastic elastomer composition comprising a polyolefin resin and a cross-linked rubber.

Since each of the above-mentioned processes comprises the steps of (i) mixing starting materials in a mixer with one another, thereby forming a mixture, and (ii) supplying the mixture to a biaxial extruder, there is a problem in that each process has the extra step (i) of mixing preliminarily the starting materials prior to the supply of them to the biaxial extruder.

SUMMARY OF THE INVENTION

In view of the above-mentioned problem in the conventional art, an object of the present invention is to provide a process for producing a thermoplastic elastomer composition excellent in its appearance and properties comprising no extra step such as the above-mentioned step (i): namely, said process comprises the step of supplying essential starting materials directly to a biaxial extruder.

The present inventors have studied extensively a process for producing a thermoplastic elastomer composition comprising no extra step such as the above-mentioned step (i). As a result, it has been found that the above-mentioned object can be accomplished by use of a biaxial extruder having a kneading disc, which forms a specific size of a tip clearance, and thereby, the present invention has been obtained.

The present invention is a process for producing a thermoplastic elastomer composition, which comprises the steps of:

(1) supplying at least an olefin copolymer rubber and an olefin resin to a plasticization-kneading zone of a biaxial extruder, which zone has at least two kneading discs forming a tip clearance of 1% or larger and smaller than 10% of an inner diameter of a cylinder in the biaxial extruder, thereby forming a melt-kneaded product; and (2) supplying an organic peroxide to a dynamically cross-linking zone of the biaxial extruder, which zone (i) is located after the plasticization-kneading zone, and (ii) has at least two kneading discs forming a tip clearance of 1% or smaller of the inner diameter of the cylinder in the biaxial extruder, thereby dynamically cross-linking the melt-kneaded product with the organic peroxide.

DETAILED DESCRIPTION OF THE INVENTION

Figure 1:
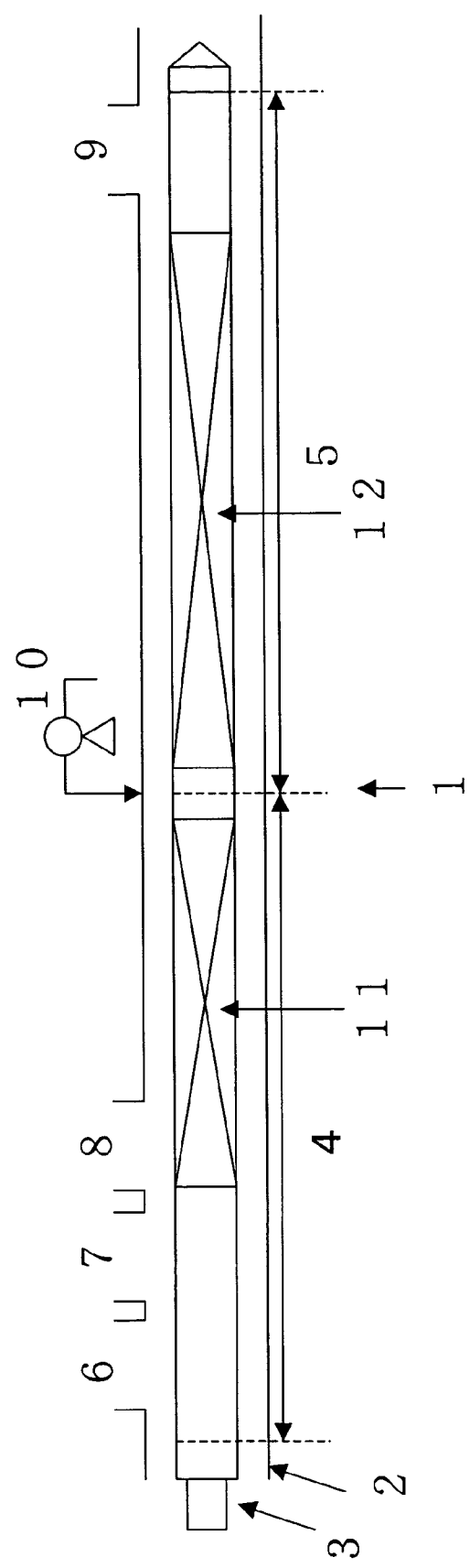
FIG. 1 shows a side-view of an exemplified biaxial extruder in the present invention, wherein the numeral 1 denotes a biaxial extruder, the numeral 2 denotes a cylinder, the numeral 3 denotes a screw, the numeral 4 denotes a plasticization-kneading zone, the numeral 5 denotes a dynamically cross-linking zone, each of the numerals 6 to 8 denotes a feeding throat, the numeral 9 denotes a vent hole, the numeral 10 denotes a pump, and each of the numerals 11 and 12 denotes a kneading segment.

An olefin copolymer rubber in the present invention means a copolymer, which (i) contains an ethylene unit and other monomer unit, and (ii) has no melting peak in a range of 90 to 170° C. on a curve of a differential scanning calorimetric measurement (DSC measurement) according to JIS K-7121 (1987), wherein "JIS" means Japanese Industrial Standards. The above-mentioned "unit" means a unit of a polymerized monomer, namely, the above-mentioned "ethylene unit" and "other monomer unit" mean a unit of a polymerized ethylene and a unit of a polymerized other monomer, respectively.

Examples of the above-mentioned other monomer are an α-olefin having 3 to 10 carbon atoms such as propylene, 1-butene, 1-pentene, 1-hexene, 4-methyl-1-pentene, 1-octene and 1-decene; a non-conjugated diene having 6 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; a vinyl ester compound such as vinyl acetate; an unsaturated carboxylic acid ester such as methyl acrylate, ethyl acrylate, butyl acrylate, methyl methacrylate, and ethyl methacrylate; an unsaturated carboxylic acid such as acrylic acid, methacrylic acid and maleic acid; a conjugated diene having 4 to 8 carbon atoms such as 1,3-butadiene, 2-methyl-1,3-butadiene, 1,3-pentadiene, and 2,3-dimethyl-1,3-butadiene; and a combination of two or more thereof.

Examples of the olefin copolymer rubber are an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, and a combination of two or more thereof, which can be produced according to a process known in the art.

The olefin copolymer rubber is preferably an ethylene-α-olefin copolymer or an ethylene-α-olefin-non-conjugated diene copolymer in order to produce a thermoplastic elastomer composition having an excellent mechanical strength. Said α-olefin is preferably propylene or 1-butene, and more preferably propylene, from a viewpoint of availability.

In case that the above-mentioned other monomer unit contained in the olefin copolymer rubber is an α-olefin unit, a ratio by weight of an amount of the ethylene unit contained in the olefin copolymer rubber to an amount of the α-olefin unit contained therein is preferably 90/10 to 30/70, and more preferably 85/15 to 45/55 in order to produce a thermoplastic elastomer composition having an excellent flexibility.

In order to produce a thermoplastic elastomer composition having an excellent mechanical strength, the olefin copolymer rubber is further preferably an ethylene-α-olefin-non-conjugated diene copolymer, and most preferably an ethylene-α-olefin-non-conjugated diene copolymer containing a non-conjugated diene unit in an amount of 2 to 20% by weight, wherein an amount of the ethylene-α-olefin-non-conjugated diene copolymer is 100% by weight. When the amount is smaller than 2% by weight, the thermoplastic elastomer composition may be lowered in its mechanical strength, and when the amount is larger than 20% by weight, the thermoplastic elastomer composition may be lowered in its flowability.

The olefin copolymer rubber may be combined with an extender oil such as a mineral oil softening agent. Such a combination is called an extended rubber in the art. An amount of the extender oil contained in the extended rubber is generally 20 to 150 parts by weight, and preferably 20 to 130 parts by weight per 100 parts by weight of the olefin copolymer rubber.

The olefin copolymer rubber has a Mooney viscosity ($ML_{1+4}$ 100° C.) of preferably 20 to 350, and more preferably 30 to 300.

The olefin resin in the present invention means (1) a homopolymer of ethylene, (2) a homopolymer of propylene, or (3) a copolymer of propylene with a monomer selected from the group consisting of ethylene and an α-olefin having 4 to 10 carbon atoms, wherein the homopolymer (2) or the copolymer (3) contains 80 to 100% by weight of a propylene unit and 0 to 20% by weight of at least one monomer unit selected from the group consisting of an ethylene unit and an α-olefin unit having 4 to 10 carbon atoms, the total amount of the propylene unit, ethylene unit and α-olefin unit being 100% by weight, and wherein the copolymer (3) has a melting peak in a range of 0 to 170° C. on a DSC curve (DSC: differential scanning calorimetrty) measured according to JIS K-7121 (1987), and a transition heat of the melting peak measured according to JIS K-7122 (1987) is 50 to 130 J/g. Examples of the above-mentioned α-olefin having 4 to 10 carbon atoms are 1-butene and 1-hexene.

Examples of the above-mentioned copolymer (3) are an ethylene-1-butene copolymer, an ethylene-1-octene copolymer, an ethylene-1-hexene copolymer, an ethylene-propylene copolymer, a propylene-1-butene copolymer, a propylene-1-hexene copolymer, a propylene-1-octene copolymer, an ethylene-propylene-1-butene copolymer, an ethylene-propylene-1-hexene copolymer, an ethylene-propylene-1-octene copolymer, and a combination of two or more thereof, which can be produced according to a process known in the art. Among them, in order to produce a thermoplastic elastomer composition having an excellent heat resistance (shape-retaining property), preferred is a homopolymer of propylene, or a copolymer of propylene with a monomer selected from the group consisting of ethylene and an α-olefin having 4 to 10 carbon atoms, wherein the homopolymer or the copolymer contains 80 to 100% by weight, preferably 90 to 100% by weight, and further preferably 95 to 100% by weight of a propylene unit, and 0 to 20% by weight, preferably 0 to 10% by weight, and further preferably 0 to 8% by weight of at least one monomer unit selected from the group consisting of an ethylene unit and an α-olefin unit having 4 to 10 carbon atoms, the total amount of the propylene unit, ethylene unit and α-olefin unit being 100% by weight.

In order to produce a thermoplastic elastomer composition having an excellent melt state at molding, the olefin resin has a melt flow rate (MFR) of preferably 0.1 to 200 g/10 minutes, and more preferably 0.5. to 50 g/10 minutes measured at 230 or 190° C. under a load of 21.18 N according to JIS K-7210 (1976).

The olefin copolymer rubber is supplied in the step (1) of the process according to the present invention in an amount of generally 50 to 95 parts by weight, preferably 65 to 93 parts by weight, and further preferably 70 to 90 parts by weight, and the olefin resin is supplied in the step (1) in amount of generally 5 to 50 parts by weight, preferably 7 to 35 parts by weight, and further preferably 10 to 30 parts by weight, wherein the total amount of the olefin copolymer rubber and the olefin resin is 100 parts by weight. When using the above-mentioned extended rubber, which is a combination of the olefin copolymer rubber with the extender oil, above-mentioned amount of the olefin copolymer rubber means an amount of the extended rubber. The supply of the olefin copolymer rubber in an amount of larger than 95 parts by weight may deteriorate a thermoplastic elastomer composition in its flexibility, and as a result, it may deteriorate a molded article comprising said thermoplastic elastomer composition in its elasticity. The supply of the olefin copolymer rubber in an amount of smaller than 50 parts by weight may lower a thermoplastic elastomer composition in its flowability, and as a result, it may deteriorate a molded article comprising said thermoplastic elastomer composition in its appearance.

The organic peroxide in the present invention has a decomposition temperature of generally 150 to 280° C., at which a half-life period thereof is 1 minute. Examples of the organic peroxide are dicumylperoxide, di-tert-butylperoxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoylperoxide, p-chlorobenzoylperoxide, 2,4-dichlorobenzoylperoxide, tert-butylperoxybenzoate, tert-butylperoxyisopropyl carbonate, diacetylperoxide, lauroylperoxide, tert-butylcumylperoxide, and a combination of two or more thereof. Among them, 2,5-dimethyl-2,5-di(tert-butylperoxy)hexane is preferable because of its easy handling.

The organic peroxide is supplied in the step (2) of the process according to the present invention in an amount of generally 0.001 to 5 parts by weight, preferably 0.005 to 3 parts by weight, and more preferably 0.01 to 1 part by weight, wherein the total amount of the olefin copolymer rubber and the olefin resin is 100 parts by weight. The supply thereof in an amount of smaller than 0.001 part by weight may lower a thermoplastic elastomer composition in its mechanical property represented by a compressive permanent strain. The supply thereof in an amount of larger than 5 parts by weight may intensify a thermoplastic elastomer composition in its offensive smell.

While the organic peroxide itself is liquid or powdery, it is very important to disperse the organic peroxide sufficiently in the biaxial extruder. Therefore, it is preferable to combine the organic peroxide with a diluent (for example, inorganic filler, mineral oil and solvent) inert to a cross-linking reaction occurred in the step (2) of the process according to the present invention. Among them, a combination of the organic peroxide with paraffin oil (diluent) is preferable, because said diluent is handled easily, and is inert to a thermoplastic elastomer composition. The diluent is combined with the organic peroxide in an amount of generally 1 to 19 parts by weight per one part by weight of the organic peroxide.

In order to improve mechanical characteristics of a thermoplastic elastomer composition, each of the olefin copolymer rubber, the olefin resin and the organic peroxide (particularly, organic peroxide) may be combined with a cross-linking coagent, which combination makes a homogeneous and mild cross-linking reaction in the step (2) of the process according to the present invention. An example of the cross-linking coagent is a polyfunctional compound such as N,N'-m-phenylenebismaleimide, toluylenebismaleimide, p-quinonedioxime, nitrosobenzene, diphenylguanidine, trimethylolpropane, divinylbenzene, ethylene glycol dimethacrylate, polyethylene glycol dimethacrylate, trimethylolpropane trimethacrylate, and allyl methacrylate.

The cross-linking coagent is supplied in an amount of 0.01 to 4 parts by weight, and preferably 0.05 to 2 parts by weight, wherein the total amount of the olefin copolymer rubber and the olefin resin is 100 parts by weight. The supply thereof in an amount of smaller than 0.01 part by weight may not be effective, and that in an amount of larger than 4 parts by weight may not be economical.

Each of the olefin copolymer rubber, the olefin resin and the organic peroxide may be combined with an additive such as an antioxidant, a weather-stabilizer, an antistatic agent, a mold release agent, a fire retardant, a metallic soap, wax, a mildew resistance, an antimicrobial agent, a filler, and a blowing (expanding) agent, or a mineral oil softening agent, so long as the additive or the mineral oil softening agent does not disturb a cross-linking reaction in the step (2) of the process according to the present invention. Each of the additive and the mineral oil softening agent may be supplied through any feeding throat of the biaxial extruder without combining with the olefin copolymer rubber, the olefin resin or the organic peroxide. A lot of the mineral oil softening agent is preferably divided into two or more parts, which are supplied through two or more feeding throats. The mineral oil softening agent is used preferably as the above-mentioned extender oil.

The biaxial extruder in the present invention may be a biaxial extruder known in the art, except that said biaxial extruder has a kneading disc forming a specific size of a tip clearance. Such a biaxial extruder known in the art is also called generally a biaxial kneader. An example of said biaxial extruder known in the art is a continuous biaxial extruder having screws excellent in kneadability, which is represented by a biaxial extruder of TEX series manufactured by The Japan Steel Works, Ltd.

Figure 3:
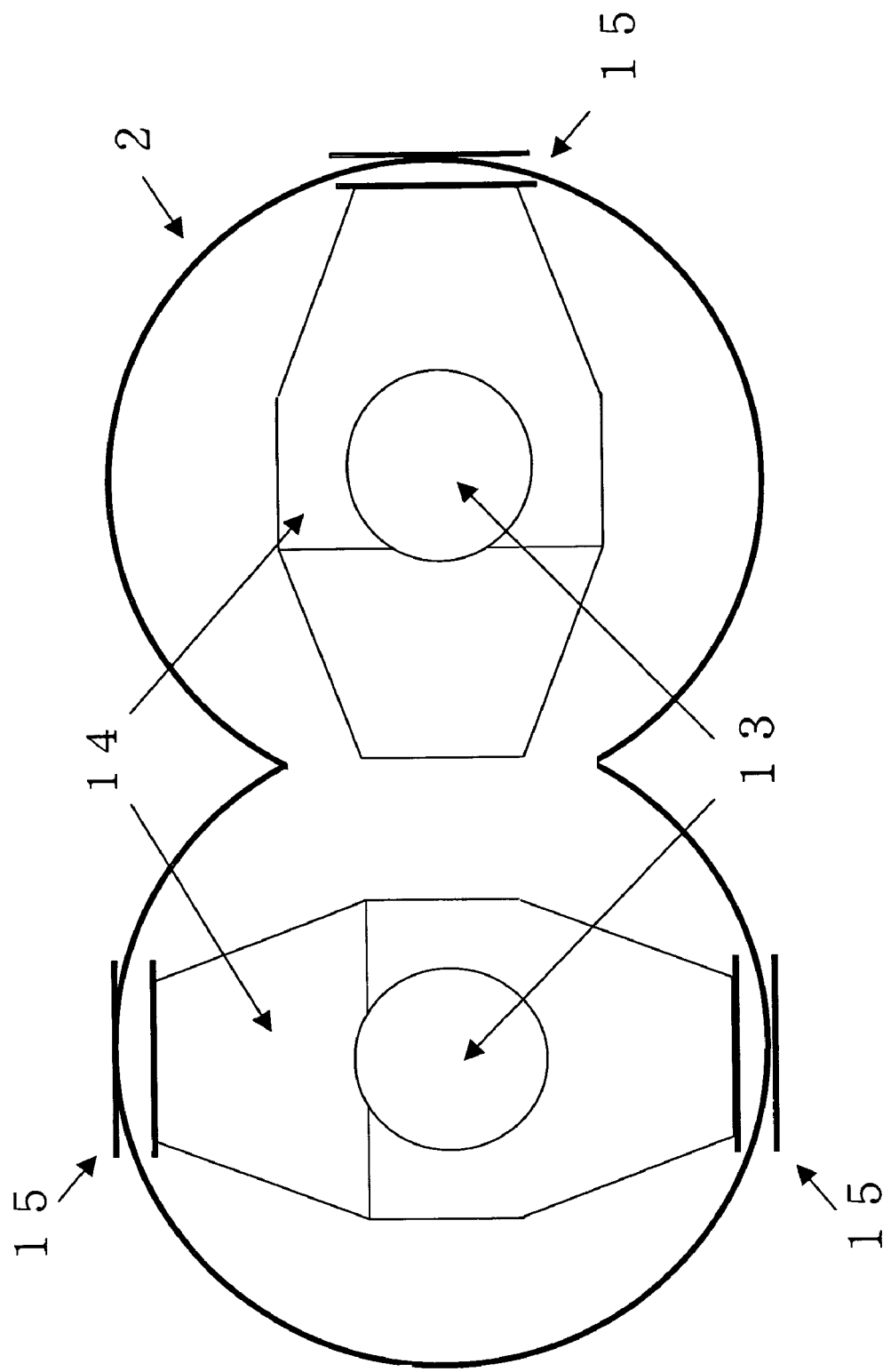
FIG. 3 shows a tip clearance in the present invention viewed in a direction of the axis 13 of the biaxial extruder 1, wherein the numeral 15 denotes a tip clearance, and wherein only an inner wall of the cylinder 2 is shown.

As shown in FIG. 3, the "tip clearance" 15 in the present invention means the smallest opening of the openings between (i) the surface of the kneading disc 14 and (ii) the surface of the inner wall of the cylinder 2 of the biaxial extruder 1.

The olefin copolymer rubber, the olefin resin, and an optional component such as the above-mentioned cross-linking coagent are supplied through the feeding throats 6, 7 and 8, respectively. The olefin copolymer rubber and the olefin resin are melt-kneaded sufficiently with each other in the plasticization-kneading zone 4. The organic peroxide is supplied with the pump 10 preferably continuously to the upper part of the dynamically cross-linking zone 5. The olefin copolymer rubber, the olefin resin and the organic peroxide are dynamically kneaded (namely, kneaded under a shearing stress) in the dynamically cross-linking zone 5, wherein a cross-linking reaction proceeds by the function of the organic peroxide. Gaseous by-products formed in the biaxial extruder 1 are discharged through the vent hole 9.

It is difficult to supply quantitatively through the feeding throat 6 the olefin copolymer rubber having a block-like shape such as a bale-shaped copolymer rubber, and therefore, it is permitted to connect the feeding throat 6 to an outlet of other extruder to crush and/or soften said block-shaped rubber in order to supply it quantitatively.

Two axes 13, 13 of the biaxial extruder 1 are the same as or different from each other in their directions of revolution. The biaxial extruder 1 is preferably a temperature-controllable extruder.

Figure 2:
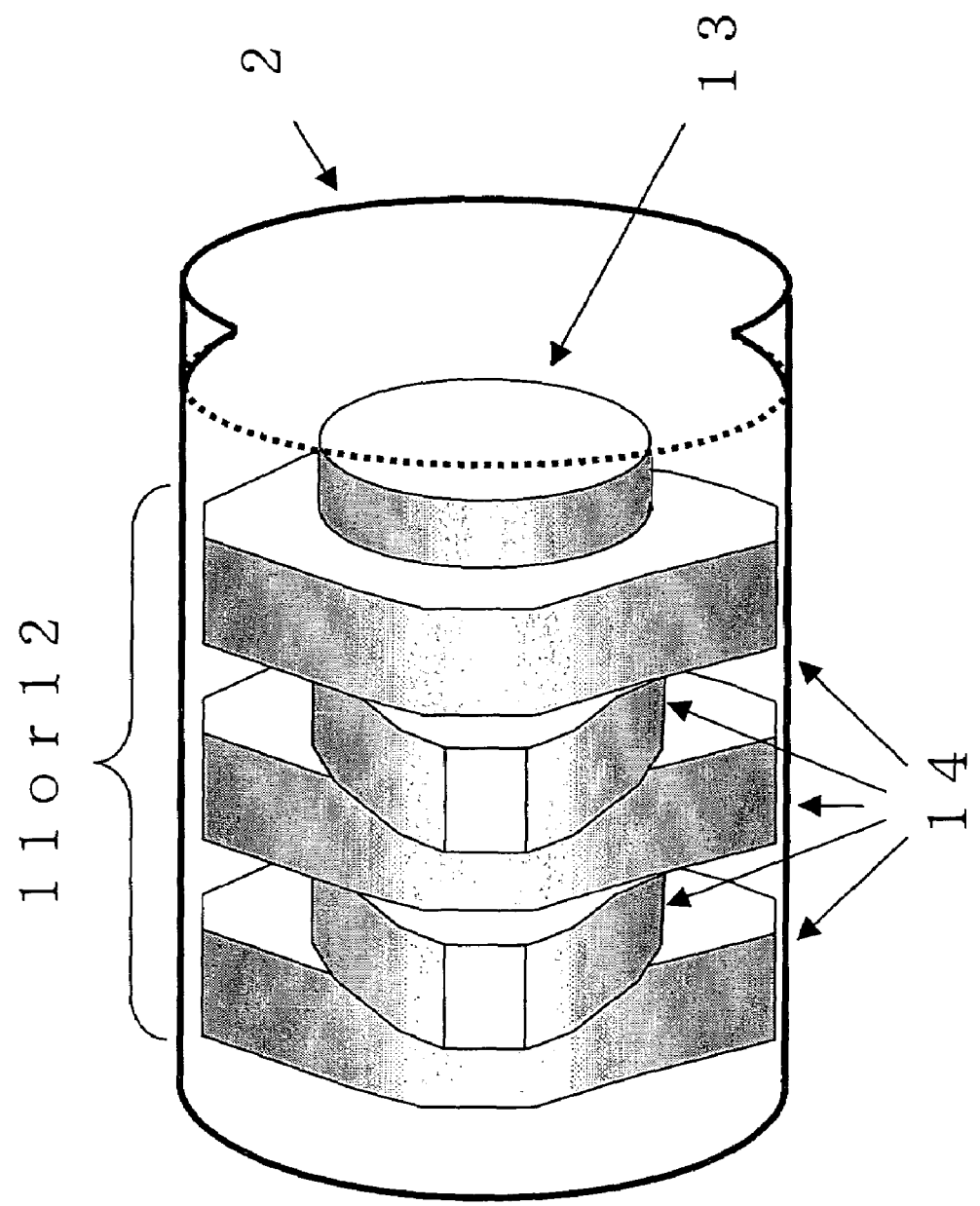
FIG. 2 shows a perspective view of an exemplified kneading segment in the present invention, wherein the numeral 13 denotes an axis (or shaft), and the numeral 14 denotes a kneading disc, and wherein only one of two axes of the biaxial extruder 1 is shown, and only an inner wall of the cylinder 2 is shown.

The screw 3 is composed of plural segments, which are classified into (I) a fully-flighted segment for conveying a substance in a high conveying-efficiency, and (II) a kneading segment for kneading and conveying a substance, which is composed of plural discs overlapped with one another. While a function of said kneading segment depends upon (i) thickness of each of said plural discs, and (ii) a relation between said discs next door to each other, said kneading segment is further classified into three kneading segments from a viewpoint of said relation: (1) a forward-conveying kneading segment for kneading a substance in a middle kneading-efficiency, and for conveying it from the upper part of the biaxial extruder 1 to the lower part thereof in a middle conveying-efficiency, which is composed of plural discs overlapped with one another, each of said plural discs being shifted in order by an angle of smaller than 90° (for example, 45°) in a forward-conveying direction; (2) a backward-conveying kneading segment for kneading a substance in a middle kneading-efficiency, and for conveying it from the lower part of the biaxial extruder 1 to the upper part thereof in a middle conveying-efficiency, each of said plural discs being shifted in order by an angle of smaller than 90° (for example, 45°) in a backward-conveying direction; and (3) a neutral kneading segment for kneading a substance in a high kneading-efficiency without conveying it to the lower part of the biaxial extruder 1, or to the upper part thereof, which is composed of plural discs overlapped with one another, each of said plural discs being shifted in order by an angle of 90° (cf. FIG. 2). Incidentally, since the majority of segments composing the screw 3 have to be able to convey a substance from the upper part of the biaxial extruder 1 to the lower part thereof, the above-mentioned kneading segment (2) or (3) is usually a minority of all segments composing the screw 3.

Examples of the above-mentioned kneading disc and a fully-flighted disc composing the above-mentioned fully-flighted segment are a two-groove disc and a three-groove disc. The kneading disc 14 in FIG. 3 is a two-groove disc.

In the plasticization-kneading zone 4, the kneaded product is conveyed to the lower part of the biaxial extruder 1 by the kneading segment 11 under a shearing stress. When the kneaded product is not a sufficiently kneaded product, the kneaded product may not be reacted homogeneously with the organic peroxide, and as a result, as a result, there may not be produced a thermoplastic elastomer composition excellent in its appearance and properties.

In order to make an optimal kneading state, the plasticization-kneading zone 4 has at least two kneading discs (at least one kneading disc regarding one axis 13 of the biaxial extruder 1), generally 2 or more and less than 2,000 kneading discs (1 or more and less than 1,000 kneading discs regarding one axis 13 of the biaxial extruder 1), and preferably 50 or more and less than 300 kneading discs (25 or more and less than 150 kneading discs regarding one axis 13 of the biaxial extruder 1), which form the tip clearance 15 of 1% or larger and smaller than 10%, preferably 1.5% or larger and smaller than 9%, and further preferably 2% or larger and smaller than 8% of an inner diameter of the cylinder 2. The tip clearance 15 of smaller than 1% makes a too small amount of the kneaded product passing through the tip clearance 15, which results in a poor kneading state. The tip clearance 15 of 10% or larger makes a large amount of the kneaded product passing through the tip clearance 15, however, makes too low shearing stress, which results in a poor kneading state.

Each of the above-mentioned at least two kneading discs, which are contained in the plasticization-kneading zone 4, and which form a tip clearance 15 of 1 to 10% of an inner diameter of the cylinder 2, has a ratio of thickness of each of said at least two kneading discs to the inner diameter of the cylinder 2 of preferably 0.3 or more and less than 1.5.

A temperature in the plasticization-kneading zone 4 is the same as or higher than a melting temperature of the olefin resin, and is generally 120 to 300°0 C., and preferably 140 to 250° C. When the temperature is lower than 120° C., an effective plasticization may not be carried out. When the temperature is higher than 300° C., it may be difficult to control a reaction with the organic peroxide in the dynamically cross-linking zone 5.

The kneaded product conveyed from the plasticization-kneading zone 4 is kneaded preferably under a mild condition in the dynamically cross-linking zone 5 in order to control a reaction of the kneaded product with the organic peroxide, wherein shear heating is restrained as low as possible. Therefore, in order to restrain the shear heating as low as possible by minimizing an amount of the kneaded product passing through the tip clearance 15, the dynamically cross-linking zone 5 has at least two kneading discs (at least one kneading disc regarding one axis 13 of the biaxial extruder 1), generally 2 or more and less than 2,000 kneading discs (1 or more and less than 1,000 kneading discs regarding one axis 13 of the biaxial extruder 1), and preferably 50 or more and less than 300 kneading discs (25 or more and less than 150 kneading discs regarding one axis 13 of the biaxial extruder 1), which form the tip clearance 15 of 0.001% or larger and smaller than 1%, preferably 0.001% or larger and smaller than 0.9%, and further preferably 0.001% or larger and smaller than 0.8% of an inner diameter of the cylinder 2. The tip clearance 15 of smaller than 0.001% may bring the kneading discs into contact with the inner diameter of the cylinder 2. The tip clearance 15 of 1% or larger may not produce a thermoplastic elastomer composition excellent in its appearance and properties because of too much shear heating caused by passing of lots of the kneaded product through the tip clearance 15.

Each of the above-mentioned at least two kneading discs, which are contained in the dynamically cross-linking zone 5, and which form a tip clearance 15 of 0.001% or larger and smaller than 1% of an inner diameter of the cylinder 2, has a ratio of thickness of each of said at least two kneading discs to the inner diameter of the cylinder 2 of preferably 0.05 or more and less than 0.3.

A temperature in the dynamically cross-linking zone 5 is set at preferably 150° C. or higher, and more preferably 150 to 300° C., and a temperature of the kneaded product in the dynamically cross-linking zone 5 is preferably 180 to 290° C., and further preferably 200 to 280° C., because substantially total amount of the organic peroxide has to be exhausted at an outlet of the biaxial extruder 1. When the temperature of the kneaded product reaches a temperature in the vicinity of 300° C., the kneaded product may easily be thermally decomposed or deteriorated, and as a result, there may not be produced a thermoplastic elastomer composition excellent in its appearance and coloring.

A thermoplastic elastomer composition produced according to the process of the present invention is molded according to a molding method (for example, an injection molding method, an extrusion molding method, a calendar molding method and a blow molding method) to make various articles such as vehicle parts (for example, a body panel, a side shield, and a skin for an interior part), electric parts (for example, a wire-protecting material and a connector), footwear (for example, a shoes sole and a sandal), necessities for leisure use (for example, a grip for a golf club and a fin for swimming), materials for engineering and building use (for example, a waterproofing sheet, a material for coating a decorated veneer board, and a window frame), gaskets, and belts.

EXAMPLE

The present invention is explained with reference to the following Examples, which do not limit the scope of the present invention.

Example 1

There was crushed with a rubber-crusher a bale-shaped ethylene-propylene-5-ethylidene-2-norbornene copolymer (olefin copolymer rubber) manufactured by Sumitomo Chemical Co. Ltd. having a trademark of ESPRENE EPDM E670F and a Mooney viscosity ($ML_{1+4}$ 100° C.) of 63, and containing an ethylene unit in an amount of 66% by weight, a propylene unit in an amount of 30% by weight, and a 5-ethylidene-2-norbornene unit in an amount of 4.0% by weight, thereby obtaining a crushed rubber.

The crushed rubber was softened in the first biaxial extruder, and then, was supplied continuously to the second biaxial extruder 1 (cf. FIG. 1) through the feeding throat 6 at the feeding rate of 86.7 parts by weight/hour, wherein the feeding throat 6 was connected to the outlet of the first biaxial extruder.

There was supplied continuously a homopolymer of propylene (olefin resin) manufactured by Sumitomo Chemical Co. Ltd. having a trademark of NOBLENE D101 and a melt flow rate of 0.5 g/10 minutes measured at 230° C. under a load of 21 N to the second biaxial extruder 1 through the feeding throat 7 at the feeding rate of 13.3 parts by weight/hour.

A mixture (cross-linking coagent) of 66.7 parts by weight of trimethylolpropane-trimethacrylate with 33.3 parts by weight of $SiO_2$ was supplied continuously to the second biaxial extruder 1 through the feed throat 8 at the feeding rate of 0.3 part by weight/hour, the mixture having a trademark of HICROSS M-P, and manufactured by Seiko Chemical Co., Ltd.

A mixture of 10 parts by weight of 2,5-dimethyl-2,5-ditertialbuthylperoxyhexane (organic peroxide) with 90 parts by weight of a paraffin oil having a trademark of PW-380 and manufactured by Idemitsu Kosan Co., Ltd. was supplied continuously to the second biaxial extruder 1 through the pump 10 at the feeding rate of 3.2 parts by weight/hour (therefore, 0.32 part by weight of the above-mentioned organic peroxide/hour), the mixture having a trademark of APO-10D, and manufactured by Kayaku Akzo Corporation.

The above-mentioned starting materials (the olefin copolymer rubber, the olefin resin, the cross-linking coagent, and APO-10D) were melt-kneaded in the second biaxial extruder 1, whose particulars are explained below, thereby producing a thermoplastic elastomer composition.

The thermoplastic elastomer composition having a pellet form was extruded with a single-screw extruder (type USV manufactured by Union Plastics Co. Ltd. having an inner diameter of 25 mm, a fully-flighted screw and a T die, thereby obtaining a sheet having a thickness of 2 mm.

The sheet had a good appearance, which was evaluated according to a method comprising the steps of:

(i) observing the number and size of a gel contained in the sheet; and (ii) determining its appearance based thereon in five ranks: "verygood", "good", "slightlybad", "bad" and "verybad".

Particulars of the above-mentioned second biaxial extruder 1 were as follows:

(1) a biaxial extruder having a trademark of TEX 65 α II, and manufactured by The Japan Steel Works, Ltd.;

(2) an inner diameter of its cylinder 2 being 69 mm;

(3) a ratio of length of the cylinder 2 to the inner diameter being 52.2;

(4) a pipe for cooling water being installed inside the cylinder 2;

(5) a temperature-controlling heater being installed outside the cylinder 2;

(6) a kneading segment 11 in the plasticization-kneading zone 4 as shown in the following Table 1; and (7) a kneading segment 12 in the dynamically cross-linking zone 5 as shown in the following Table 2.

Example 2

Example 1 was repeated except that (1) the olefin copolymer rubber was changed to an ethylene-propylene-5-ethylidene-2-norbornene copolymer manufactured by Sumitomo Chemical Co. Ltd., having a trademark of ESPRENE EPDM E673 and a Mooney viscosity ($ML_{1+4}$ 100° C.) of 78, and containing an ethylene unit in an amount of 66% by weight, a propylene unit in an amount of 29.5% by weight, and a 5-ethylidene-2-norbornene unit in an amount of 4.5% by weight, (2) the feeding rate of the olefin copolymer rubber was changed to 70 parts by weight/hour, (3) the olefin resin was changed to an ethylene-propylene copolymer manufactured by Sumitomo Chemical Co. Ltd., having a trademark of NOBLENE AH161C and a melt flow rate of 3 g/10 minutes measured at 230° C. under a load of 21 N, and containing an ethylene unit in an amount of 7% by weight and a propylene unit content in an amount of 93% by weight, (4) the feeding rate of the olefin resin was changed to 30 parts by weight/hour, and (5) the feeding rate of APO-10D containing the organic peroxide was changed to 2.4 parts by weight/hour. The obtained sheet had a very good appearance.

Comparative Example 1

Example 1 was repeated except that (1) the kneading segment 11 in the plasticization-kneading zone 4 was changed to that as shown in the following Table 3, and (2) the kneading segment 12 in the dynamically cross-linking zone 5 was changed to that as shown in the following Table 4. The obtained sheet had a bad appearance.

Comparative Example 2

Example 1 was repeated except that the kneading segment 11 in the plasticization-kneading zone 4 was changed to that as shown in the following Table 3. The obtained sheet had a very bad appearance.

Comparative Example 3

Example 2 was repeated except that (1) the kneading segment 11 in the plasticization-kneading zone 4 was changed to that as shown in the following Table 3, and (2) the kneading segment 12 in the dynamically cross-linking zone 5 was changed to that as shown in the following Table 4. The obtained sheet had a slightly bad appearance.

Comparative Example 4

Example 2 was repeated except that the kneading segment 11 in the plasticization-kneading zone 4 was changed to that as shown in the following Table 3. The obtained sheet had a slightly bad appearance.

TABLE 1

| | Number of kneading discs | Tip clearance of each kneading disc (%) | Ratio of thickness of each kneading disc to inner diameter of cylinder |
|---|---|---|---|
| Forward | 10 | 4.3 | 0.30 |
| Forward | 50 | 4.3 | 0.10 |
| Forward | 10 | 2.2 | 0.10 |
| Backward | 10 | 4.3 | 0.20 |
| Backward | 10 | 4.3 | 0.10 |

TABLE 2

| | Number of kneading discs | Tip clearance of each kneading disc (%) | Ratio of thickness of each kneading disc to inner diameter of cylinder |
|---|---|---|---|
| Forward | 150 | 0.72 | 0.10 |
| Backward | 30 | 0.72 | 0.10 |
| Neutral | 70 | 0.72 | 0.10 |

TABLE 3

| | Number of kneading discs | Tip clearance of each kneading disc (%) | Ratio of thickness of each kneading disc to inner diameter of cylinder |
|---|---|---|---|
| Forward | 10 | 0.72 | 0.30 |
| Forward | 60 | 0.72 | 0.10 |
| Backward | 10 | 0.72 | 0.20 |
| Backward | 10 | 0.72 | 0.10 |

TABLE 4

| | Number of kneading discs | Tip clearance of each kneading disc (%) | Ratio of thickness of each kneading disc to inner diameter of cylinder |
|---|---|---|---|
| Forward | 100 | 2.2 | 0.10 |
| Forward | 50 | 4.3 | 0.10 |
| Backward | 30 | 4.3 | 0.10 |
| Neutral | 70 | 4.3 | 0.10 |

The invention claimed is:

1. A process for producing a thermoplastic elastomer composition, which comprises the steps of:

(1) supplying at least an olefin copolymer rubber and an olefin resin to a plasticization-kneading zone of a biaxial extruder, which zone has at least two kneading discs, wherein the kneading discs in the plasticization-kneading zone form a tip clearance of 2% or larger and smaller than 10% of an inner diameter of a cylinder in the biaxial extruder, thereby forming a melt-kneaded product; and (2) supplying an organic peroxide to a dynamically cross-linking zone of the biaxial extruder, which zone (i) is located after the plasticization-kneading zone, and (ii) has at least two kneading discs, wherein the kneading discs in the dynamically cross-linking zone form a tip clearance of 1% or smaller of the inner diameter of the cylinder in the biaxial extruder, thereby dynamically cross-linking the melt-kneaded product with the organic peroxide.

2. The process for producing a thermoplastic elastomer composition according to claim 1, wherein each of said at least two kneading discs, which are contained in the plasticization-kneading zone, and which form a tip clearance of 2 to 10% of an inner diameter of a cylinder in the biaxial extruder, has a ratio of thickness of each of said at least two kneading discs to the inner diameter of the cylinder of 0.3 or more.

3. The process for producing a thermoplastic elastomer composition according to claim 1, wherein each of said at least two kneading discs, which are contained in the dynamically cross-linking zone, and which form a tip clearance of 1% or smaller of an inner diameter of a cylinder in the biaxial extruder, has a ratio of thickness of each of said at least two kneading discs to the inner diameter of the cylinder of less than 0.3.

4. The process for producing a thermoplastic elastomer composition according to claim 1, wherein the olefin copolymer rubber, olefin resin and organic peroxide are supplied in an amount of 50 to 95 parts by weight, 5 to 50 parts by weight, and 0.001 to 5 parts by weight, respectively, the total amount of the olefin copolymer rubber and olefin resin being 100 parts by weight.

5. The process for producing a thermoplastic elastomer composition according to claim 1, wherein the olefin copolymer rubber is an ethylene-α-olefin-non-conjugated diene copolymer.

6. The process for producing a thermoplastic elastomer composition according to claim 1, wherein the olefin copolymer rubber has a Mooney viscosity ($ML_{1+4}$ 100° C.) of 20 to 350.

7. The process for producing a thermoplastic elastomer composition according to claim 1, wherein the olefin resin is (1) a homopolymer of propylene, or (2) a copolymer of (i) propylene with (ii) ethylene and/or α-olefin, the homopolymer (1) or the copolymer (2) containing 80 to 100% by weight of a propylene unit and 0 to 20% by weight of at least one monomer unit selected from the group consisting of an ethylene unit and an α-olefin unit having 4 to 10 carbon atoms, and the total amount of the propylene unit, ethylene unit and α-olefin unit being 100% by weight.

* * * * *